United States Patent
Lamp et al.

(10) Patent No.: US 8,038,344 B2
(45) Date of Patent: Oct. 18, 2011

(54) CONVERTER WITH A CONTAINER FOR RECEIVING MOLTEN METAL AND WITH A MEASUREMENT DEVICE FOR THE OPTICAL TEMPERATURE DETERMINATION OF THE MOLTEN METAL AND METHOD FOR THE TEMPERATURE DETERMINATION IN SUCH A CONVERTER

(75) Inventors: Torsten Lamp, Düsseldorf (DE); Herbert Koechner, Pulheim (DE)

(73) Assignee: VDEH-Betriebsforschurgs institut GmbH, Dusseldorf (DE)

( * ) Notice: Subject to any disclaimer, the term of this patent is extended or adjusted under 35 U.S.C. 154(b) by 685 days.

(21) Appl. No.: 12/158,448

(22) PCT Filed: Dec. 13, 2006

(86) PCT No.: PCT/EP2006/012014
§ 371 (c)(1),
(2), (4) Date: Sep. 24, 2008

(87) PCT Pub. No.: WO2007/079894
PCT Pub. Date: Jul. 19, 2007

(65) Prior Publication Data
US 2009/0074028 A1    Mar. 19, 2009

(30) Foreign Application Priority Data
Dec. 21, 2005 (DE) .......... 10 2005 061 675

(51) Int. Cl.
*G01J 5/02* (2006.01)
(52) U.S. Cl. ....................... 374/139; 374/131
(58) Field of Classification Search ............. 374/120, 374/121, 123, 124, 130, 131, 139
See application file for complete search history.

(56) References Cited

U.S. PATENT DOCUMENTS

| | | | |
|---|---|---|---|
| 7,197,199 B2* | 3/2007 | Cuypers et al. | 374/E11.015 |
| 7,635,220 B2* | 12/2009 | Dams et al. | 374/139 |
| 2004/0047395 A1* | 3/2004 | Xie et al. | 374/139 |
| 2006/0114967 A1* | 6/2006 | Dams et al. | 374/139 |
| 2006/0115205 A1* | 6/2006 | Cuypers et al. | 385/12 |
| 2008/0019416 A1* | 1/2008 | Dams et al. | 374/131 |
| 2010/0020845 A1* | 1/2010 | Dams et al. | 374/139 |

FOREIGN PATENT DOCUMENTS

| | | |
|---|---|---|
| EP | 0646778 | 4/1995 |
| EP | 0802401 | 10/1997 |
| EP | 0806640 | 11/1997 |
| EP | 1424543 | 6/2004 |

OTHER PUBLICATIONS

HKM 4/03 Kurier *Zeitung für die Mitarbeiter der Hüteenwerke Krupp Mannesmann, Plakatives Leitbild*, Germany.

* cited by examiner

*Primary Examiner* — Brad Bennett
(74) *Attorney, Agent, or Firm* — Boyle Fredrickson, S.C.

(57) ABSTRACT

The invention relates to a converter with a container for receiving molten metal and with a measurement device for the optical temperature determination of the molten metal. The converter has an optical waveguide for guiding electromagnetic radiation emitted by the metal to an optical detector for determining the temperature of the metal from an analysis of the electromagnetic radiation. The converter further has a line arranged between the optical detector and the container through which fluid flows for guiding and transporting the optical waveguide. The optical detector is arranged, spaced apart from the container, in a region in which the surrounding temperature is less than 150 DEG C. The invention further relates to a method for the temperature determination of the molten metal in such a converter.

10 Claims, 1 Drawing Sheet

CONVERTER WITH A CONTAINER FOR RECEIVING MOLTEN METAL AND WITH A MEASUREMENT DEVICE FOR THE OPTICAL TEMPERATURE DETERMINATION OF THE MOLTEN METAL AND METHOD FOR THE TEMPERATURE DETERMINATION IN SUCH A CONVERTER

This application claims a benefit of priority under 35 USC §119 based on PCT application PCT/EP2006/012014, filed Dec. 13, 2006, which claims priority to German Application 10 2005 061 675.5, filed Dec. 21, 2005. The entire contents of these applications are hereby expressly incorporated by reference into the present application.

BACKGROUND OF THE INVENTION

The invention is directed to a converter with a container adapted to receive molten metal and with a measurement device for optical temperature determination of the molten metal, and a method for temperature determination in such container.

In steel production, pig iron is converted into steel predominantly in an oxygen blow converter. To this end, typically 150 tons to 400 tons of liquid pig iron are filled into a large crucible-shaped container (converter vessel) and converted into crude steel by blowing in and/or blowing through large quantities of oxygen. The temperature of the metal bath increases due to the combustion of the undesirable pig iron components.

The important target value for a control process is the temperature of the steel bath at the end of the converter process. For measuring the temperature, the converter process is typically interrupted and the temperature is measured manually. For example, measurement rods with thermocouples attached at one end are inserted into the molten metal.

The time required for the temperature measurement and the resulting corrective measures make it difficult to control the process and the process flow. Measures are therefore taken to measure the temperature continuously in situ during the converter process, which significantly improves the process flow and also markedly increases the efficiency of the steel production.

For example, it is known from practical applications to continuously measure the temperature in situ by conducting a pyrometric analysis of the electromagnetic radiation emitted from the steel bath. For example, the surface of the steel bath is monitored. However, this method produces unacceptable measurement uncertainties due to a severely variable emission from the heterogeneous and vigorously moving bath level. Providing inserts, such as windows, in the fireproof brick wall of the converter has also been considered. However, windows have certain disadvantages due to the optical degradation caused by the high temperatures which can reach 1800° C. Access ports provided in the fireproof bricks are under severe mechanical stress due to settlement processes which deform the mostly tube-shaped access ports to the melt to such a degree so as to obstruct optical access to the steel bath along the line of sight.

SUMMARY OF THE INVENTION

In this context, it is an object of the invention to propose a converter which enables continuous optical temperature measurements of the molten metal with only a small measurement uncertainty, and a method for determining the temperature of the molten metal in such a converter.

The high temperatures have the effect that the optical waveguide slowly melts at the end which is immersed into the molten metal or which is moved into the immediate vicinity of the molten metal. According the invention, the position of the optical waveguide is tracked by the transport produced by the fluid in the line with the result that a surface of the optical waveguide capable of receiving the electromagnetic radiation emitted by the metal surface or by the surface capable of emitting the representative electromagnetic radiation is always immersed in the molten metal or is located in proximity of the molten metal required for receiving the emitted electromagnetic radiation.

The converter of the invention has an optical detector for determining the temperature of the metal from an analysis of the electromagnetic radiation conducted by the optical waveguide. According to the invention, this optical detector is located in a region spaced from the container where the ambient temperature is less than 150° C., in particular preferably less than 70° C., and particularly preferred less than 50° C.

By providing according to the invention a line which guides the optical waveguide, in which the optical waveguide is transported by a fluid flowing through the line, it becomes feasible for the first time to arrange the optical detector required for analyzing the electromagnetic radiation at a considerable distance from the container, namely in a region where the ambient temperature has decreased to a level where it does no longer adversely affect the electronic circuitry. For example, the optical detector in an oxygen blow converter is arranged more than 5 m from the converter vessel (container).

The line carrying the fluid flow and arranged between the optical detector and the container can be a dedicated transport line provided for conveying the optical waveguide, which can also terminate above a free surface of the molten metal, where it brings the optical waveguide into contact with or into close proximity with the molten metal for receiving the electromagnetic radiation emitted by the metal. The transport line can also terminate at an opening provided in the container wall and convey the optical waveguide to the metal through this opening, wherein the fluid flowing through the line has the additional advantage of at least partially preventing this opening from closing.

Alternatively and preferably, a fluid line system which already exists on the container is used as a line for transporting the optical waveguide, for example the line system for supplying soil gas, for example composed of purge gases, such as nitrogen or argon, or of fresh gas, such as oxygen or oxygen mixtures. Existing converters can then be retrofitted into converters according to the invention without large conversion expenses. Also feasible as a combination of a transport line specifically provided for the optical waveguide with an existing line system, for example when the optical waveguide is initially transported in a dedicated transport line system and, for example, is only connected with the soil gas system shortly before the soil gas opening of a soil gas system, for example via a tee in the region of the soil gas opening of the converter. The transport line provided for the optical waveguide can be inserted into an existing line as an additional line, for example, coaxially in the center of a line which conveys fluid to a fluid supply opening in the container, for example in a line which conveys soil gas to a soil gas opening. Moreover, this arrangement with the transport line inside an existing line can be implemented only in certain regions, for example in the region of the fireproof brick wall of a converter. With an arrangement of the transport line inside an existing fluid line, the fluid jacket flowing on the outside around the transport line thermally insulates the inner transport line through which the optical waveguides is guided.

The invention is preferably implemented with a converter having a container for receiving molten metal, for example an oxygen blow converter. However, the invention is not limited to this embodiment, so that the terms "converter" and "molten metal" used here for sake of simplification and uniformity of the terminology include all devices which have a container for receiving a molten material, wherein the temperature of the molten material can be determined from an analysis of the electromagnetic radiation emitted by the material with an optical detector. For example, the term "converter" can also include electric arc furnaces, melt crucibles and the like.

The optical waveguide is transported essentially by the fluid flowing through the line. The optical waveguide can hereby be provided with surface properties that allow a particularly efficient transfer of the transport forces of the fluid to the optical waveguide, for example a particular structure formed on the surface of the optical waveguide. Preferably, a soft, bendable optical waveguide is employed which is known, for example, from the technical communication field. These are particularly suited to transport the optical waveguide around corners, constrictions or bends in the line system.

The fluid for transporting the optical waveguide in the line is preferably either a fluid, for example oxygen, which is already required for treatment of the molten metal. Alternatively, other gases, for example inert gases, can also be used.

In a particularly preferred embodiment, the converter has a supply of an optical waveguide. This can be a wound-up optical waveguide, of which one end is inserted into the molten metal through the line carrying the fluid flow, while the other end is connected to the optical detector. Alternatively, the optical waveguide can be supplied in other forms, for example stored as a loop or a ball. The optical waveguide is preferably fed into the molten metal at a constant transport speed. With an optical waveguide of the type G62.5/125 with an outside diameter of 0.9 mm, the fluid advantageously flows through the line with a velocity of 5 m per second.

In a preferred embodiment, the converter according to the invention has an unwinding device, which successively unwinds the optical waveguide from a supply. Such unwinding devices may have, for example, two counter-rotating, preferably rubber-coated cylinders, with for example one cylinder being driven and guiding the optical waveguide through the gap between the cylinders for transport, which can be continuous or discontinuous, and can also be controlled. In a preferred embodiment, the unwinding device is arranged in a region where the ambient temperature is less than 150° C., preferably less than 70° C., and particularly preferred less than 50° C.

In a preferred embodiment, a housing can be provided for the optical detector, wherein an optional unwinding device can also be disposed in this housing. The housing protects the optical detector and the unwinding device from damaging environmental effects, such as dirt. In a particularly preferred embodiment, the housing 10 has during operation an interior pressure which corresponds to the interior pressure of the connected gas line, in which the optical waveguide is transported by the fluid. This simplifies transport of the optical waveguide by the fluid.

In a preferred embodiment, the housing can be thermally insulated, i.e., preventing heat from entering the housing. Such housings can be used in particular when the optical detector and for example the unwinding device must be well protected from temperature effects in spite of the significantly lower ambient temperature. During operation of the system of converters other containers with molten metal may move past the converter of the invention, even if the optical detector and/or the unwinding device are located at a significant distance from the container receiving the molten metal. This can cause brief temperature increases when such container moves past the optical detector. The thermal insulation of the housing prevents these short temperature peaks from damaging the optical detector located in a region where the average ambient temperature is less than 150° C.

In a particularly preferred embodiment, the thermally protected housing can also include active cooling.

In a preferred embodiment, at least sections of the optical waveguide are guided through the gas line which is also used to introduce the gas into the container for treatment of the molten metal, and are transported by the gas. In a particular preferred embodiment, the optical waveguide is inserted into the gas line through an insertion opening located in the gas line. The insertion opening is preferably arranged in the region of a gas source which supplies the gas to the gas line. A gas source is to be understood as the source from which the gas is supplied to a gas line system associated solely with the converter. The gas source can be, for example, a branch from a utility gas grid, whereby the gas for individual converters is obtained from the general service line. Such branch lines from the utility grid for the respective converter are frequently located at the sufficient distance from the container receiving the molten metal of the respective converter, so that an optical detector arranged in this region or an unwinding device arranged in this region is disposed in a region where the ambient temperature is less than 150° C. The optical detector can therefore advantageously be arranged in this region of the branch line. By using the flowing fluid to transport the optical waveguide according to the invention, the optical waveguide is reliably transported to the container in spite of the significant distance to the container.

In a preferred embodiment, the container has pivot pins from which the container is pivotally suspended. In such an arrangement, the line through with the flowing fluid can be routed through the pivot pin, so that the optical waveguide can be easily conveyed to the container in spite of the pivoting motion of the container.

Another aspect of the invention is a method performed on a converter. The optical waveguide is conveyed to the container and is then transported through the line with the flowing fluid which extends at least along sections between the optical detector and container. The detector is used to determine the temperature by analyzing the electromagnetic radiation guided by the optical waveguide from the molten metal to the detector. The optical waveguide can be transported continuously or intermittently.

In a preferred embodiment of the method of the present invention, the optical waveguide is conveyed to the molten metal through a fluid opening in the container, with an additional fluid being conveyed to the container through this fluid opening, for example a soil gas. Before the optical waveguide comes into contact with the molten metal, the optical waveguide is held in a position where it is not yet immersed, and the electromagnetic radiation conducted by the optical waveguide to the detector is analyzed by the detector and/or the pressure curve of the additional fluid supplied to the container through the fluid opening is measured. The transport of the optical waveguide held in this position into the molten metal begins only when the measurement value corresponds to a predetermined standard value (the measurement values correspond to predetermined standard values). A particular problem may occur when the optical waveguide is introduced into the container through the fluid opening, because molten metal can freeze in the region of the fluid opening or the opening may close for a different reason. It has been shown that closure of the fluid opening can be determined by observing the pressure dependence of the additional fluid flowing into the container through the fluid opening, for example soil gas, which is supplied in addition to the fluid that transports the optical waveguide. Alternatively or in addition, closure can be determined by analyzing the electromagnetic radiation transmitted to the detector when the optical waveguide is held in the non-immersed position. It is possible to define threshold values or value ranges, above which or within which transport can begin.

In a particularly preferred embodiment of the method of the present invention, a closure of the fluid opening can be detected by intermittent measurements before a new transport commences. The optical waveguide is also transported intermittently at each intermittent measurement. Before each new measurement, the transport of the optical waveguide which is held in a not yet immersed position begins only when the measured value is less than or greater than a predefined threshold value (depending how the threshold is defined) or lies in a predefined value range. When the pressure measurement and the analysis of the electromagnetic radiation are performed concurrently, the transport of the optical waveguide which is not yet in the immersed position begins only when the pressure value is less than or greater than a threshold value (depending how the threshold is defined), or lies in a predetermined value range, and when a value obtained from an analysis of the electromagnetic radiation is also less than or greater than a predefined threshold value (depending how the threshold is defined) or lies in a predefined value range. It can also be defined by performing concurrent measurements to start the transport only when at least the pressure value or the value resulting from the analysis of the electromagnetic radiation satisfied the aforementioned conditions.

In another preferred embodiment of the method of the present invention, soil gas is supplied to the molten metal through a soil gas opening, and the composition of the soil gas is enriched with oxygen for a certain time period before and/or during the measurement. In a preferred embodiment, the soil gas is enriched with 5% to 20% oxygen. The enrichment can also be controlled. An input valuable for the control process can be the pressure curve of the soil gas. This can prevent freezing of the molten metal in the region of the soil gas opening, and/or a frozen region can be melted.

Thus, in one aspect of the invention, a converter having a container for receiving molten metal and a measurement device for optical temperature determination of the molten metal includes an optical waveguide for guiding electromagnetic radiation to an optical detector. The converter further includes an optical detector for determining the temperature of the metal from an analysis of the electromagnetic radiation. The converter still further includes a line with flowing fluid arranged between the optical detector and the container, and the optical waveguide is guided inside at least a section of the line and transported inside the line by the fluid. The optical detector is arranged at a distance from the container in a region having an ambient temperature less than 150° C.

In another aspect of the invention, a method for optical temperature measurement on a converter includes the steps of: (a) conveying the optical waveguide to the container; (b) transporting at least a section of the optical waveguide through a line with flowing fluid arranged between the optical detector and container; (c) guiding the electromagnetic radiation by the optical waveguide from the molten metal to the detector; and (d) determining the temperature of the metal.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiment illustrated in the drawings accompanying and forming a part of this specification, wherein like reference numerals designate the same elements in the several views, and in which.

Figure 1:
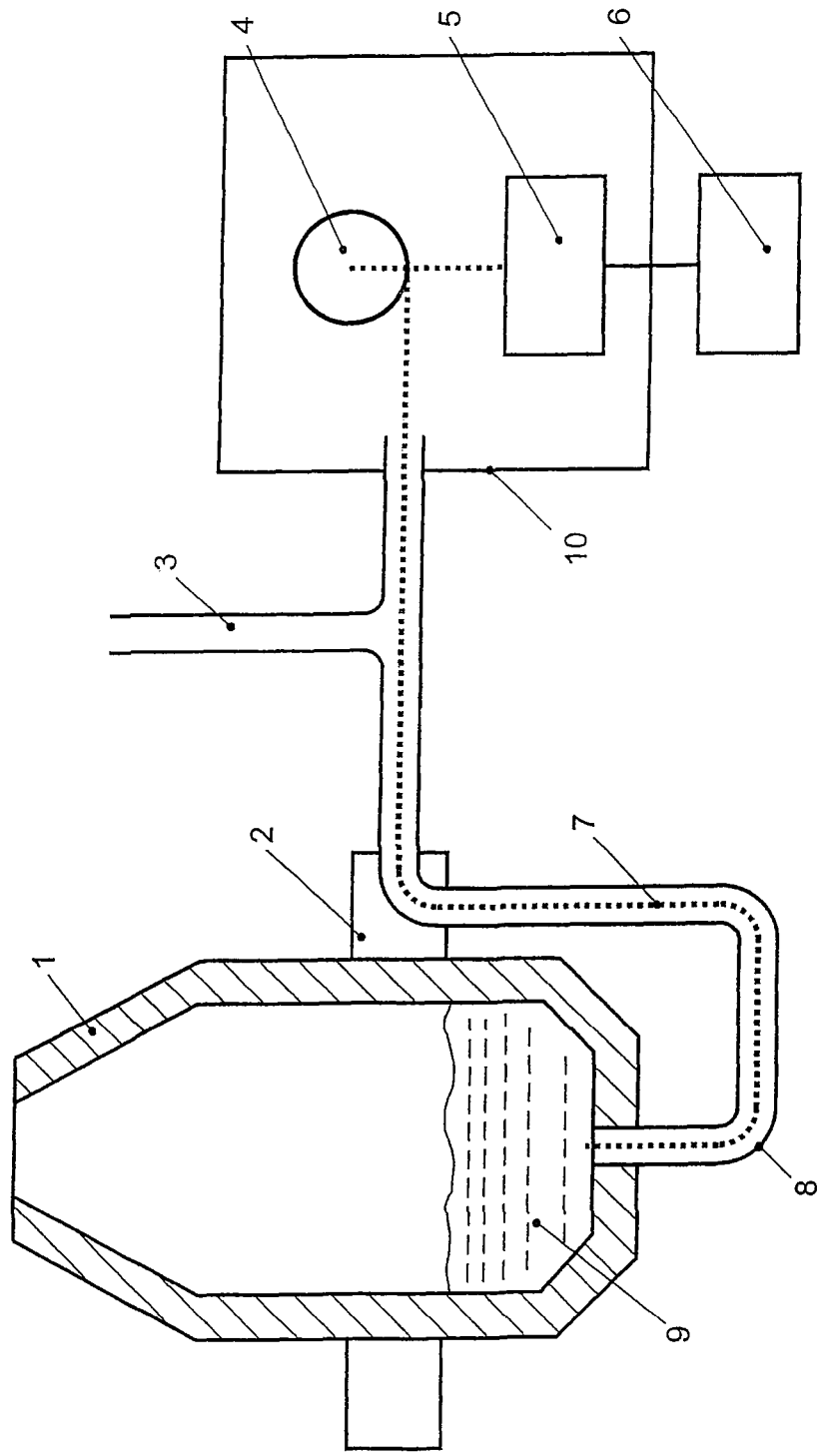
FIG. 1 illustrates one embodiment of the container of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected, attached, or terms similar thereto are often used. They are not limited to direct connection but include connection through other elements where such connection is recognized as being equivalent by those skilled in the art.

DETAILED DESCRIPTION OF THE DRAWINGS

The invention will now be described in more detail with respect to the drawing which illustrates a single exemplary embodiment. The sole FIGURE shows a schematic diagram of a converter with a measurement device for optical temperature determination of the molten metal.

The FIGURE shows a container 1 for receiving the molten metal. This container is supported in a frame (not shown) by a pivot pin 2. A gas supply 3 extends from a gas source (not illustrated in detail) via a gas line 8 to a gas opening arranged in the bottom section of the container 1. Gas can be supplied to the metal bath 9 via the gas supply 3.

Also illustrated is an unwinding device 4 on which the optical waveguide 7 is wound. One end of the optical waveguide 7 is connected to an optical sensor 5, which is in turn connected to a signal processing device 6. The unwinding device 4 and the optical detector 5 can be housed in a thermally protected housing 10. The optical waveguide 7 is inserted into the metal bath through the gas line 8 which is supplied with gas via the gas supply 3.

The end of the optical waveguide 7 extending into the metal bath 9 receives radiation from the molten metal and conducts the radiation via the optical waveguide 7 to the optical sensor 5. The optical signals are there converted into electronic signals which can be further processed by the signal processing device 6 for determining the temperature of the metal in the metal bath 9. Because the temperature of the molten metal causes the immersed end of the optical waveguides to melt, the position of the optical waveguide must track. Tracking is performed by gas flowing through the gas supply 3 and the gas line 8.

We claim:

1. A converter with a container for receiving molten metal and with a measurement device for optical temperature determination of the molten metal comprising:
   an optical waveguide for guiding electromagnetic radiation to an optical detector for determining the temperature of the metal from an analysis of the electromagnetic radiation,
   a line with flowing fluid arranged between the optical detector and the container, the optical waveguide being guided inside at least a section of the line and transported inside the line by the fluid,
   wherein the optical detector is arranged at a distance from the container in a region, having an ambient temperature less than 150° C.

2. A converter according to claim 1, further comprising an unwinding device which successively unwinds the optical waveguide from a supply and which is also arranged in a region where the ambient temperature is less than 150° C.

3. A converter according to claim 1, further comprising a thermally protected housing for the optical detector.

4. A C-converter according to claim 1, further comprising at least one gas line for introducing gas for treatment of the molten metal in the container, with at least a section of the optical waveguide guided inside of the line and transported inside the line by the gas.

5. A converter according to claim 4, wherein the optical waveguide is inserted in the gas line through an insertion opening, and wherein the insertion opening is arranged in a region of a gas source supplying the gas to the gas line.

6. A converter according to claim 1, further comprising pivot pins, from which the container is pivotally suspended, and through which the line carrying the fluid is guided.

7. A method for optical temperature measurement on a converter comprising the steps of:
 (a) conveying the optical waveguide to the container;
 (b) transporting at least a section of the optical waveguide through a line with flowing fluid arranged between the optical detector and container;
 (c) guiding the electromagnetic radiation by the optical waveguide from the molten metal to the detector; and
 (d) determining the temperature of the metal.

8. A method according to claim 7, further comprising the steps of:
 (e) conveying the optical waveguide to the molten metal via a fluid opening in the container;
 (f) supplying an additional fluid to the container through the fluid opening before the optical waveguide comes into contact with the molten metal;
 (g) maintaining the optical waveguide in a not yet immersed position;
 (h) measuring the electromagnetic radiation; and
 (i) transporting the optical waveguide into the molten metal only when a measured value corresponds to a predetermined starting value.

9. A method according to claim 8, wherein steps (h) and (i) are repeated intermittently.

10. A method according to one of the claim 7, further comprising the steps of:
 (j) supplying soil gas to the molten metal via a soil gas opening, and
 (k) enriching the composition of the soil gas with oxygen.

* * * * *